Dec. 7, 1948. G. DEAKIN Re. 23,054

TELEPHONE EXCHANGE SYSTEM

Original Filed June 7, 1943 5 Sheets-Sheet 1

INVENTOR.
GERALD DEAKIN

BY Robert Harding Jr.

ATTORNEY

TELEPHONE EXCHANGE SYSTEM

Original Filed June 7, 1943 5 Sheets-Sheet 2

INVENTOR.
GERALD DEAKIN

BY

Robert Harding Jr
ATTORNEY

Dec. 7, 1948. G. DEAKIN Re. 23,054

TELEPHONE EXCHANGE SYSTEM

Original Filed June 7, 1943 5 Sheets-Sheet 3

INVENTOR.
GERALD DEAKIN

BY
Robert Harding Jr
ATTORNEY

Dec. 7, 1948. G. DEAKIN Re. 23,054

TELEPHONE EXCHANGE SYSTEM

Original Filed June 7, 1943 5 Sheets-Sheet 4

INVENTOR.
GERALD DEAKIN

BY
Edward D. Phinney
ATTORNEY.

TELEPHONE EXCHANGE SYSTEM

Original Filed June 7, 1943 5 Sheets-Sheet 5

INVENTOR.
GERALD DEAKIN

BY Robert Harding Jr.

ATTORNEY

Reissued Dec. 7, 1948

Re. 23,054

UNITED STATES PATENT OFFICE 23,054

TELEPHONE EXCHANGE SYSTEM

Gerald Deakin, New York, N. Y., assignor to International Standard Electric Corporation, New York, N. Y., a corporation of Delaware Original No. 2,385,968, dated October 2, 1945, Serial No. 489,883, June 7, 1943. Application for reissue August 19, 1947, Serial No. 769,333

43 Claims. (Cl. 179—6)

This invention relates to new and useful improvements in telephone exchange systems and more particularly to switching arrangements for giving a variety of special services to the subscriber.

The object of the invention is to provide means whereby a central exchange attendant or automatic means, or some combination of the two may take care of calls during the absence of a subscriber. Messages may thus be recorded at the central exchange and later repeated to the subscriber, or any other similar service or combination of services may be accomplished by means provided at the central exchange without permanently tying up any of the switching devices used for the customary establishment of connections between calling and called subscribers.

In accordance with the present invention, this is accomplished by providing a plurality of special line service circuits at the exchange. Any one of these may be taken into use by a subscriber entitled to this special service, whereupon the circuit taken into use will be attached to such subscriber's line by means separate from the customary switching devices of the exchange, e. g. a special relay or set or relays. All connections established to this subscriber's line will thereafter be handled by the equipment provided in the special service circuit taken into use. Upon his return, the subscriber may communicate with such circuit and obtain the information required.

The arrangement herein disclosed may be utilized also for providing a subscriber with super-audio tele-program service, to provide private connections with a toll board, a telegraph office or stock ticker, for providing special night service for P. B. X's, and for many other purposes too numerous to mention.

The present invention may be embodied in any suitable telephone exchange system. As here illustrated, it is particularly adapted to cooperate with the system disclosed in my co-pending application, Serial No. 484,184, filed April 23, 1943, now Patent No. 2,380,950, issued August 7, 1948.

Figure 1:
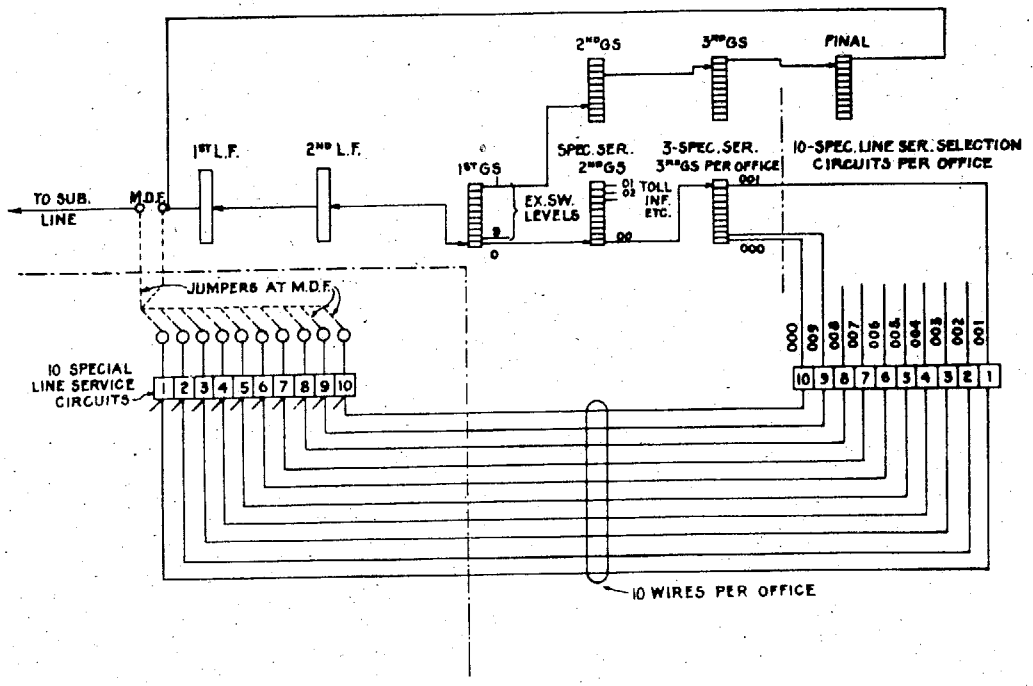
Figure 2:
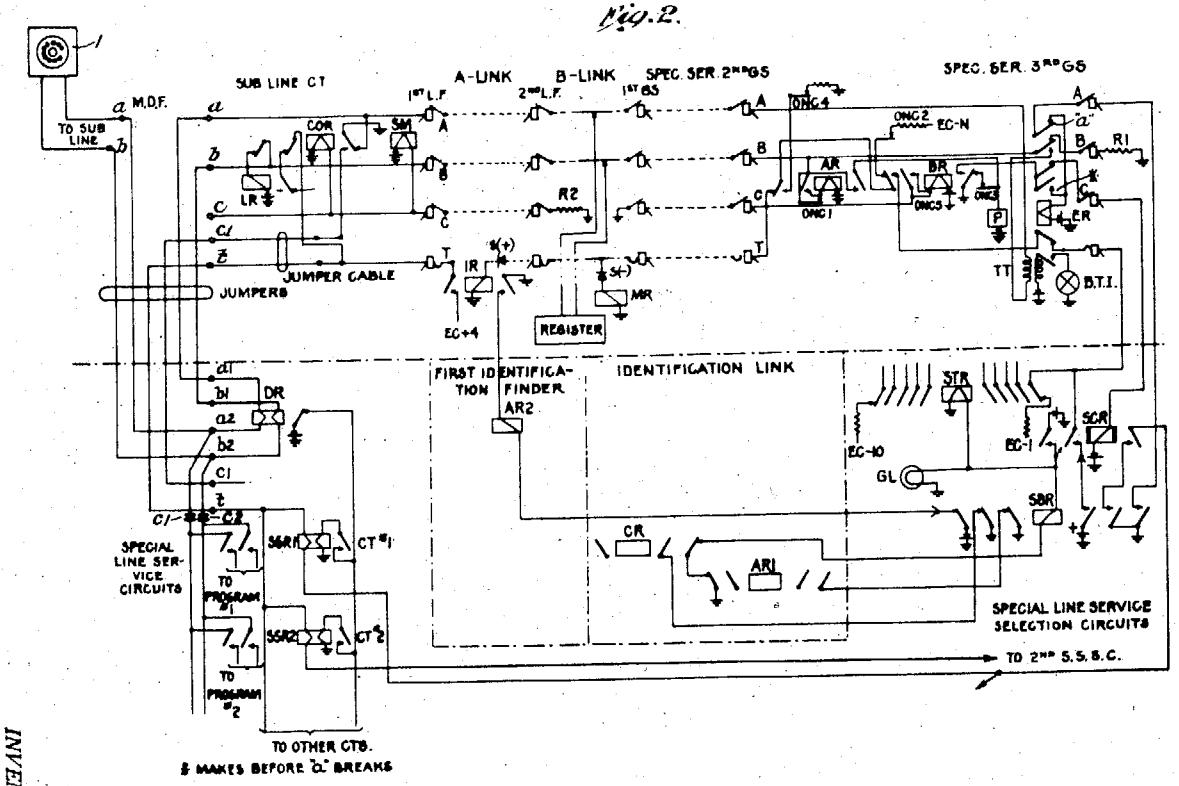
Figure 3:
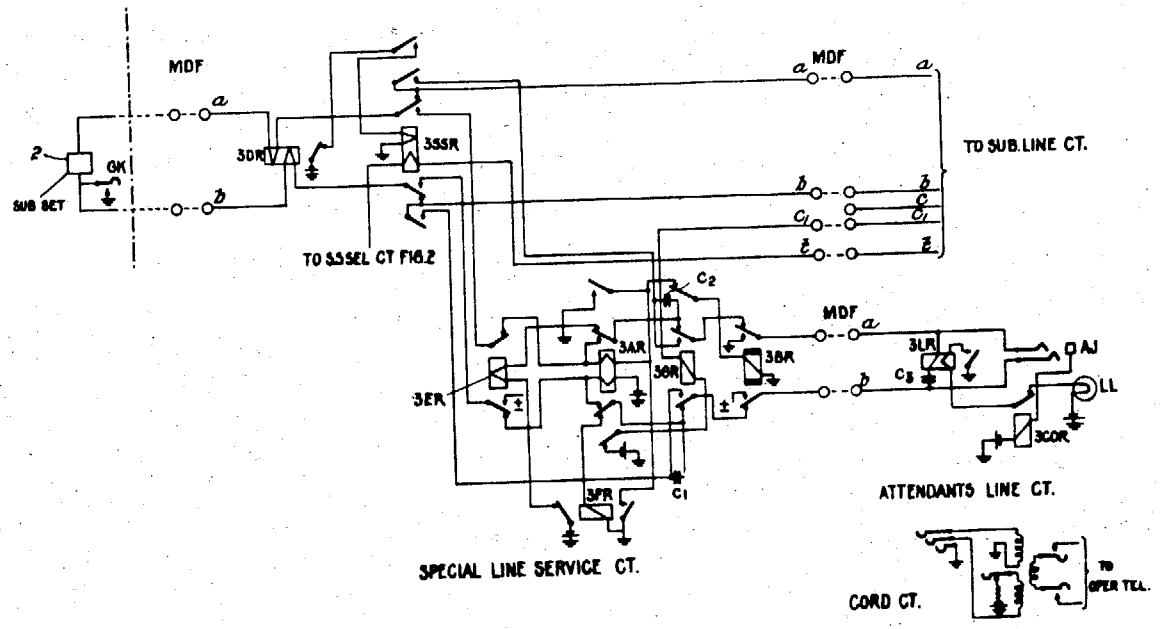

The invention will now be described with reference to the drawings in which:

Fig. 1 is a general block diagram of the system;

Fig. 2 diagrammatically illustrates the special line service selection circuits and as much of the central exchange switching equipment as is necessary for an understanding of the present invention;

Fig. 3 is a diagram illustrating an attendant's position which may be provided at a special line service circuit to take care of calls that come in during the absence of a subscriber; and Figs. 4 and 5 (one being placed above the other) diagrammatically illustrate a special line service circuit provided with a phonographic recording and reproducing means to record messages received during the absence of a subscriber and later to play them back to the subscriber under his control.

*Special tele-program service selection*

As shown in Fig. 1 the special line service circuits are jumpered to the subscriber's line at the main distributing frame M. D. F. and no alteration whatsoever is made in the regular switching circuits. It is possible, if ever necessary, to jumper as many as ten different special line services to the same line. A typical case of jumpering is shown in Fig. 2.

In Fig. 1 is diagrammatically shown the usual arrangement of first and second line finders, intermediate group selectors and final selectors. It is assumed that the 0 level of the first group selectors will be reserved for trunks to special service second group selectors. It is further assumed that the 00 level of the special service second group selectors will be reserved for trunks to a small group of special line service third group selectors, the ten levels of which are connected respectively to the ten special line service selection circuits and, therefore, have the numbers 001 to 000. Two or three third group selectors would serve a 10,000 line office. All of the special line service circuits responding to the same number are connected by a common lead to the corresponding special service selection circuit. The amount of common equipment for a 10,000 line office is very small.

When a subscriber has dialed a three digit special line service number, the corresponding special line service circuit is connected for use within a second and the special line service selection circuit instantly freed thereafter, providing that the identification circuit (Fig. 2) is not in use by the wire chief or by a toll operator. If it is so used, then the special line service call must wait for two to four seconds, after which the special line service circuit is connected and the selection circuit freed in a second or less. Two or three special line service third group selector circuits are provided so that subscribers may not lose time in picking up a selector on account of slow dialing on the part of a subscriber or on account of many simultaneous calls, but only one special line service selection circuit may be in use at the same time.

When the subscriber removes the handset at station 1 (Fig. 2) his line is extended by the first and second line finders to a register in the usual way. A relay DR having two differentially disposed windings is connected in series with the line. The relay DR is common to all special line service circuits jumpered to this line and does not operate. When the subscriber hears the dial tone, he dials to the register the wanted special service number in the usual way. The first digit selects the 0 level of the first group selector, the second digit the 00 level of the special service second group selector, and the third digit the wanted level of the special line service third group selector which we will assume in this case is 001. The special line service third group selector functions during selection in the same manner as any other group selector. The operation of the added relay ER in the 3rd GS will be described hereinafter.

When the brushes of the third group selector come to rest on the terminals of the special line service selection circuit, the circuit of the *b* wire will be grounded over resistance R1. This releases the register as on a short number call.

When the C brush of the special service third group selector makes contact with the C terminal, it operates relay SCR of the special line service selection circuit, in this case circuit No. 001. Each of these circuits has only this one relay. Relays SBR and STR are common to all ten selection circuits. Relay SCR energizes relay STR which removes the test potentials from the T terminals of all ten levels, thus making it impossible for another special service third group selector to pick up a second special line service selection circuit.

Should the common identification circuit be in use by a toll operator, relay AR1 of the identification link will be energized. Should the local wire chief be using the identification circuit, relay CR will be energized. When either of these relays is energized, ground is removed from relay SBR. However, when the identification link is not being used by either a toll operator or the wire chief, a circuit is established from ground, back AR1, back CR, winding SBR, front SCR to battery. SBR operates and removes ground from AR1 and CR of identification link, thus making the identification circuit busy to the wire chief and toll operator.

Relay SBR also removes battery from the windings of AR2 of all first identification finder circuits, of which there would be one hundred in a 10,000 line office. Over a front contact SBR places positive battery over the front contact of SCR on the *t* wire, thus energizing the identification relay IR of the A-link. AR2 of the first identification finder does not operate since, as before stated, its circuit is now open, thus the associated identification finder does not hunt. IR places a predetermined battery potential on the *t* wire of the calling subscriber's line and a circuit is closed from ground, front SBR, front SCR, common lead to all special line service circuits No. 001, winding $SSR_1$ jumpered to calling line, *t* wire of calling subscriber's line, T brush of first line finder, front IR, to positive battery. $SSR_1$ operates and locks up over a front contact in series with the back contact of DR. This special line service circuit cannot now be released until DR is energized.

Finally SBR closes a circuit from ground, front SBR, brush A of special service third group selector, back ER, winding ER to battery. ER locks up over a front contact and a front contact of BR. ER opens the circuits of the A, B, C and T brushes of the selector and thus releases the special line service selection circuit. Relay SCR is made somewhat slow-releasing so as to insure he positive operation of $SSR_1$. ER closes a busy tone circuit over the *a* and *b* wires and hte calling subscriber hears the busy tone (sometimes not needed), whereupon he hangs up and releases the finders and selectors. Upon its deenergization SCR releases relays STR and SBR, thereby restoring the special line service selection circuits and the identification circuits to normal As before stated, the special line service circuit No. 1, i. e. relay $SSR_1$, remains locked up over the back contact of DR.

*Absentee special line service cricuit with direct trunk to attendant with call back (Fig. 3)*

A subscriber to this service is given an ordinary telephone set 2 plus a simple grounding key GK. To prevent intentional or unintentional release of the special line service circuit while the subscriber is away, this grounding key should be locked or concealed since a momentary depression of it releases the special line service equipment.

At the central office the special line service circuit, consisting of seven relays is jumpered at the main distributing frame into the subscriber's line as shown in Fig. 3. No change is required in the automatic equipment indicated in the upper part of Fig. 2. The special line service circuit is connected by a two-wire trunk to a manual attendant's position in the same or a distance office where it terminates in two additional relays, a line relay 3LR and a cut-off relay 3COR, an answering jack AJ, and a line lamp LL. The attendant's position is equipped with a few cord circuits, each having a listening key LK and a ring-back key RK.

*Absentee line circuit connected for service*

When not connected for service, the absentee line circuit remains inactive on calls to and from the subscriber. Relay 3DR is differentially wound and does not operate. Also, because of this differential winding, it offers little impedance to speech transmission but if further reduction in impedance is required, the two windings may be shunted by suitable condensers or non-inductive resistances, the latter being much the cheaper.

To put the absentee circuit into service, the subscriber dials the proper three-digit special line service number, for example, No. 001, and in this way operates relay 3SSR as described with reference to Fig. 2. 3SSR locks up over the back contact of 3DR and cuts the subscriber's line in two, connecting the outside line wires to the windings of 3AR and the *a* and *b* wires from the automatic switches at the central exchange to front contacts of relay 3GR. 3GR is energized over the wire $c_1$ when the subscriber's cut-off relay COR (see Fig. 2) operates and opens the operating circuit of 3AR. When 3SSR opens the calling line circuit, the automatic connection over the line finders and special group selectors to the special third group selector releases. When COR falls away, 3GR is released and the circuit of 3AR and 3BR is closed through the subscriber's telephone set. BR operates for an instant and applies ringing current to the attendant, thus operating 3LR which locks up and lights line lamp LL. Upon the closure of the top front contact of 3AR, 3BR is short-circuited and closes the trunk circuit from the attendant through to the calling subscriber over front contacts of 3AR. 3AR disconnects 3FR and 3ER and removes battery from 3GR. The subscriber is thus enabled to talk with the attendant when the latter answers. The calling subscriber does not receive a busy tone to indicate completion of a special line service connection. When the subscriber hangs up, 3AR is released, but 3SSR remains locked up. At the operator's position 3COR and 3LR release when the attendant removes the cord from the jack AJ.

*Absentee subscriber's line called by distant station*

When a distant station operates a final selector to seize the absentee subscriber's line, COR of the absentee subscriber's regular line circuit operates and energizes 3GR (Fig. 3), after which ringing current passes over the *a* and *b* wires, front contacts of 3SSR, front contacts of 3GR, back contacts of 3BR, thence to winding of 3LR through condenser C3. 3LR locks up and lights line lamp LL. The attendant answers by plugging in her cord circuit and the center grounded repeating coil or other similar device trips the ringing relay associated with the automatic switchboard and places the calling subscriber and attendant in direct communication. The calling subscriber's meter operates. The attendant takes such not of the call as may be prescribed, after which the distant calling subscriber hangs up and releases the automatic connection, but 3SSR remains locked up.

*Returning absentee subscriber calls attendant*

When the absentee subscriber returns, he removes handset, whereupon 3AR and 3BR operate, provided that the line is free at the central office and, therefore, 3GR is not operated. 3BR applies a momentary impulse of ringing current to the trunk and rings up 3LR which lights line lamp LL. 3AR short-circuits 3BR which releases and closes the calling subscriber's line through to the attendant's trunk over back contacts of 3BR, 3GR and 3ER, and front contacts of 3AR and 3SSR. The attendant answers with cord circuit. The windings of the repeating coil shunt the windings of 3AR but not sufficently to cause 3AR to release or to apply undue current to the calling subscriber's transmitter. The attendant gives the returning absentee subscriber any messages which may have been left for him, after which the subscriber hangs up and releases 3AR which restores the absentee line circuit at the central office to normal. 3SSR does not release.

The *a* and *b* line wires from the automatic switchboard are connected to the attendant's trunk through small capacity condensers C1 and C2, the purpose of which is to enable the calling subscriber to hear that he is being rung even while he is talking to the attendant. He may continue talking to the attendant since the volume of the ringing current will not interfere with the conversation which cannot be overheard by the distant calling subscriber, or he may momentarily depress GK and release 3SSR, thus connecting his line through to the automatic switchboard and to the calling subscriber.

*Attendant rings absentee line*

The attendant may ring back on the absentee subscriber's line in the following manner. When a cord circuit is inserted into the answering jack of the absentee line circuit, relay 3FR operates over the *b* wire to battery at RK in the cord circuit. 3FR removes battery from 3ER and short-circuits 3BR. To apply ringing current to the absentee line, the attendant depresses the cord circuit ring-back key RK, thus releasing 3FR which closes the circuit of 3ER from ground at the repeating coil of the cord circuit, *a* wire, back 3BR, back 3GR, back 3AR, winding 3ER, back 3FR to battery. 3ER applies ringing current to the absentee line as long as RK is depressed. When RK is released, 3FR again operates, opens the circuit of 3ER, and again short-circuits 3BR. When the absentee subscriber answers, 3AR operates, but not 3BR, thus a ringing impulse is not applied to the attendant's trunk. 3AR completes the talking circuit over its front contacts and at the same time disconnects 3ER and 3FR.

*Release of special line service circuit*

The calling subscriber may release the special line service circuit at any time, during a call, or even without removing the handset, merely by momentarily depressing GK which grounds the *b* wire and unbalances 3DR, causing it to operate and open its back contact, and consequently, the holding circuit of 3SSR.

The arrangement shown in Fig. 3 provides a direct line for each subscriber from his central office to the attendant. There may be many cases in which the central office will be a long way from the central office to which the attendant is connected. In such cases it may be desirable to use a few common trunks to the attendant from a group of subscribers and to associate these trunks with a simple identification system. The attendant is not interested in identifying the number of the subscriber giving the message, but she is interested in identifying the number of the subscriber asking for messages. She must be able to identify the number of the calling party so as not to give out information to a caller with malicious intent. The equipment the operator would have would be similar to that provided for toll operators. Many other modifications of the circuit are possible but in all cases the method of connecting the service to the line would remain unaltered.

*Absentee special line service with automatic recorder at central office (Figs. 4 and 5)*

A subscriber to this service is given a telephone set 3 with three push button keys, a listening key LK, a rewind key RWK, and an answering key AK. To prevent the intentional or unintentional release of the special line service circuit while the subscriber is away, a lock is provided to prevent the depression of LK.

At the central office the special line service equipment consists of two parts, a part individual to the subscriber's line (Fig. 4) and a part (Fig. 5) common to a group of the individual equipments.

The individual part, the special line service circuit is jumpered into the subscriber's line at the main distributing frame. The *a* and *b* connections are made on the regular terminals provided for each line. The $c_1$ and *t* connections are made over jumper cables as shown on the subscriber's line circuit (Fig. 1). Since but a fraction of the total lines in any office will be equipped for special line service, these jumper cables would be run only as required and they would terminate at one end on extra terminal strips on the M. D. F. and at the other end on extra terminal strips in the line finder bays. The connection at the bay end would be completed by jumper wire to a conventiently exposed T terminal at the rear of the ribbon cable and to an exposed terminal at the rear of the cut-off relay. The individual equipment consists of ten relays, some miscellaneous apparatus and a "recorder."

The control circuit (Fig. 5) consists of one standard eight-brush finder, eighteen relays and an amplifier for transmitting and receiving to and from the recorder. The control circuit finder has capacity for sixty special line service circuits (Fig. 4). Sufficient control circuits are supplied to handle the calculated maximum simultaneous traffic on a reasonable probability basis. Common to all the control circuits in the same office is a phonograph and amplifier associated with an interrupter P. Int. These are shown at the bottom of Fig. 5.

*Recorder*

Figure 4:
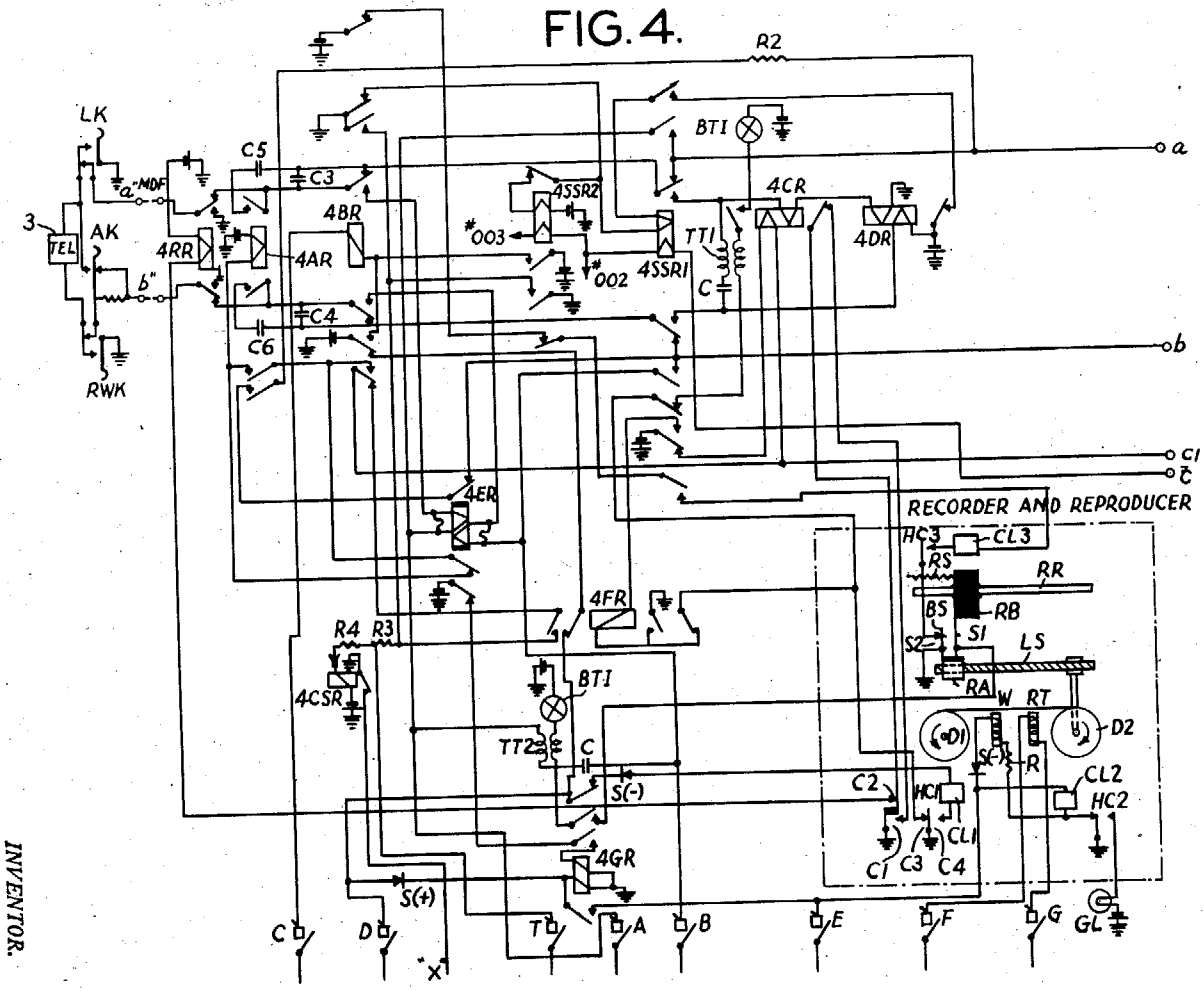
Figure 5:
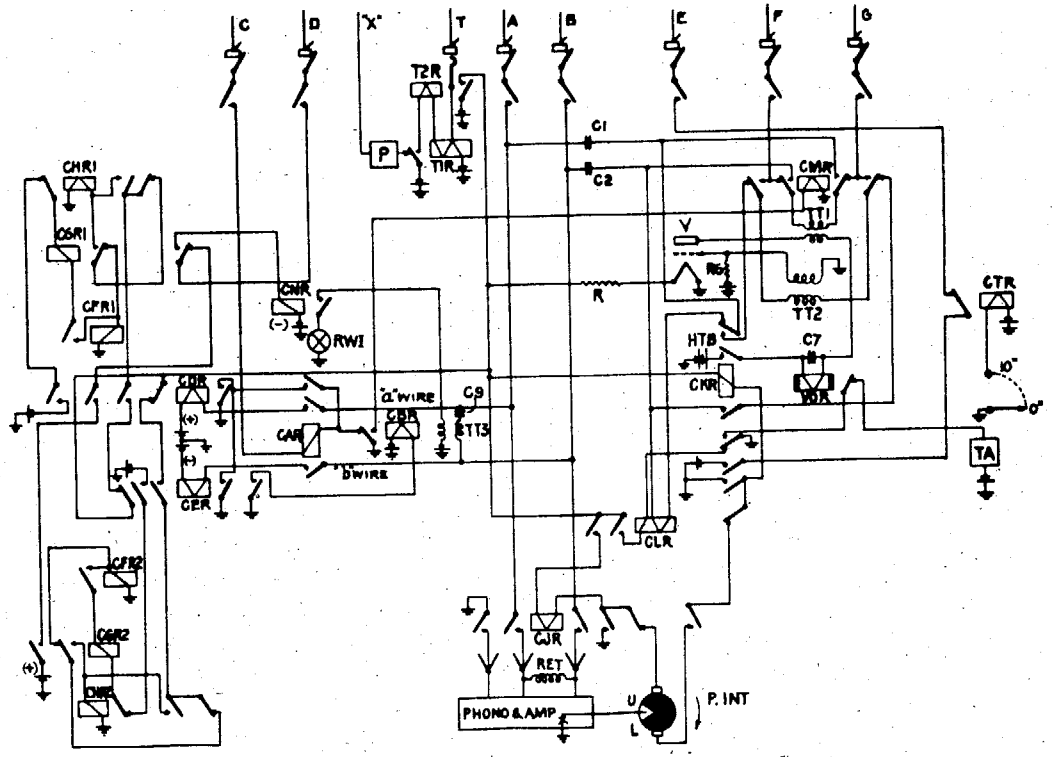

While Figs. 4 and 5 are especially designed for use with a wire recorder, the circuits may be readily modified for use with any other type of recorder capable of remote control.

In the wire recorder diagrammatically shown in Fig. 4, there are two spools of wire, a normal storage spool D1 and a take-up spool D2. These two spools with the other parts of the recorder are mounted as a unit on a common framework and a number of units are mounted on the same bay one above the other and driven from a common shaft.

Clutch magnet cl. 2, when energized, causes D2 to rotate in the direction of the arrow and unwind D1. Likewise clutch magnet cl. 1 causes spool D1 to rotate in the direction of the arrow and unwind D2. When D1 is fully wound, home contact assembly HC1 is in the position shown. When clutch cl. 2 is energized and spool D1 commences to unwind, contacts C4 and C1 make, immediately thereafter C3 breaks, and two seconds later contact C2 breaks. Similarly, on the rewind just about as D1 is fully rewound, contact C2 makes, two seconds later C3 makes, and immediately thereafter C1 and C4 break. When D1 is fully found, D2 is obviously fully unwound and home contact assembly HC2 is in the position shown. When D2 is fully wound, HC2 opens its left contact and closes its right contact and lights guard lamp GL.

One "needle" RT is used for both recording and transmitting. The change from one to the other is made by reversing the amplifier (Fig. 5) as explained hereinafter. A second "needle" W is magnetized during recording and wipes out any previous message which may be on the wire just before the wire passes over the recording needle RT.

Associated with the spools D1 and D2 is a lead screw LS which controls the movement of brush carriage RA. The distance RA moves along the lead screw to the right is in proportion to the length of wire wound on D2. The brush carriage RA carries a light contact spring S1 and a heavy back stop BS. As RA advances, BS breaks contact S2, S1 is forced into contact with BS and BS slides RB along rod RR. RB remains in its advanced position due to the friction with which its clutch cl. 3 normally grips RR. RB advances to a position corresponding to the most advanced position of RA. When the motion of RA is reversed, RB remains in its advanced position until the friction clutch cl. 3 is energized, whereupon it returns to its normal position under the tension of rectractile spring RS.

The length of conversation which can be recorded depends upon the length of the wire on the spools. As standard machine has enough wire for about one hour's conversation. The speed of rewind is three times that of unwind, thus a full hour's conversation may be rewound in twenty minutes. This means that the absentee subscriber must wait twenty minutes after his return before he may listen to the first recorded message in those cases where spool D1 has been fully unwound. In actual practice it is assumed that the average total length of all recorded messages will be much less than one hour and in any case a rewound "ring" is given when the rewind is complete.

*Method of operation—Absentee line circuit connected for recording*

When not connected for service, the absentee line circuit remains inactive on calls to and from the subscriber. To connect the special line service circuit for recording, the subscriber dials the proper three digit special line service number for recording, which we will assume is 002, and in this way operates $4SSR_1$ as described with reference to Figs. 1 and 2. $4SSR_1$ locks up over back contacts of 4DR and 4BR and disconnects the *a* and *b* wires of the subscriber's line from the central office line circuit and in place thereof connects them to the windings of relays 4CR and 4DR. 4CR operates but not 4DR which is differentially wound. 4CR closes the busy tone circuit if the recorder is fully rewound, circuit from ground at HC1, contact C3, front $4SSR_1$, one winding of transformer TT1, front 4CR, busy tone interrupter BTI to battery. The busy tone indicates to the subscriber that the special line service circuit is connected for recording. The subscriber hangs up and releases 4CR but $4SSR_1$ remains locked up over the back contact of 4DR.

The recorder normally rewinds when the special line service circuit is disconnected. This rewind circuit may be traced from ground at HC1, contact C4 which is closed when D1 is not fully rewound, clutch cl. 1, rectifier S(—), back 4GR, back 4FR, back 4BR to battery. When D1 is fully rewound, contact C4 opens and the recorder comes to rest. Should the subscriber reconnect the special line service circuit before the recorder is fully rewound, he will not hear the busy tone until the rewind is complete, since the circuit of the primary winding of the busy tone coil will be open at contact C3 until the rewind is complete.

The subscriber may wait at his telephone or he may hang up and check later by again removing the handset. When the rewind is complete, he will hear the busy tone. In fact, he will continue to hear the busy tone wherever he removes the handset until either a message is recorded, thus opening contact C3, or 4DR is energized thus releasing $4SSR_1$.

With D1 fully rewound and $4SSR_1$ energized, 4FR operates and locks up. It may not be released until $4SSR_1$ is released. A calling subscriber may not pick up the recorder while 4FR is deenergized because the circuit of wire C1 extends over a front contact of 4FR.

*Absentee subscriber's line called*

When a distant station calls the absentee subscriber's line over the customary intermediate and final selectors, COR of the absentee's regular line circuit operates. We will assume that 4FR of the special line service circuit (Fig. 4) is operated. A circuit is established from ground, front COR, wire $c_1$, back 4BR, front 4FR, resistance R3, resistance R4, common starting relay 4CSR to battery. 4CSR energizes the power magnet P (Fig. 5) of all idle control finders. They hunt for the calling special service line circuit and test relay T1R of the first to reach that circuit operates and makes the selected circuit busy over its low resistance winding in series with low resistance relay T2R. T1R opens the circuit of the power magnet and the finder comes to rest. Resistance R4 and 4CSR are shunted to battery by the low resistance windings of T1R and T2R. The reduction in current is sufficient to cause 4CSR to fall away and release the idle hunting finders. 4CSR, however, may be again operated by another calling special line service circuit over that circuit's pair of resistances R3 and R4.

*Calling subscriber hears announcement*

The ringing current applied to the *a* and *b* wires passes over front contacts of $4SSR_1$ to brushes A and B, front contacts of T2R, condensers C1 and C2, winding of CLR. CLR operates and locks up over a front contact in series with a back contact of CKR and a front contact of T2R. CLR energizes CJR when the grounded segment of P. Int. makes contact with brush U which is connected to a back contact of CJR. CJR locks up over a front contact in series with front contacts of CLR and T2R. In the interval between the traveling of the grounded segment from brush U to brush L, a phonograph is put into operation and connected to the *a* and *b* wires, that is, to the calling subscriber's line. A high impedance, low resistance retardation coil Ret. bridged across the *a* and *b* wires of the amplifier associated with the phonograph trips the ringing relay and the calling subscriber's meter operates. Shortly after this, the phonograph sends out on the calling line an announcement like the following: "Party you called is absent—Your spoken message will be automatically recorded—Speak clearly and hang up promptly when finished—Go ahead now." After this announcement, brush L of P. Int. becomes grounded, thereby operating CKR which locks up over a front contact in series with a front contact of T2R and disconnects P. Int. CKR releases CLR which, in turn, leases CJR which disconnects the phonograph. Should the subscriber hang up before the full announcement has been heard, CLR is released when T2R releases.

*Message recorded*

CKR connects the amplifier circuit to the *a* and *b* wires of the calling line. The circuit may be traced from brush A, front T2R, condenser C1, front CKR, back CMR, one winding of transformer TT2, back CMR, front CKR, condenser C2, front T2R to brush B. CKR places high tension battery HTB on the anode plate of tube V through winding of relay VOR. CKR puts the recorder into operation by energization clutch cl. 2 (Fig. 4), circuit from negative battery, front CKR, back CTR, brush E, thence in multiple through cl. 2 and rectifier S(—), winding of wipe-out needle W, resistance R, contact HC2 to ground. The energization of clutch cl. 2 causes the wire to move from spool D1 to spool D2 and any message which may be on the wire is wiped out as it passes needle W. In this way a new message may not be recorded upon an existing message.

The grid of V has a normal negative bias. However, when speech currents pass through TT2, V amplifies these currents through one winding of transformer TT1, the second winding of which is connected over back contacts of CMR, front contacts of T2R, and brushes F and G to the winding of the combination recording and transmitting needle RT (Fig. 4) of the recorder, and as the magnetic wire advances, the speech currents are recorded upon it. The plate current during speech is sufficient to operate VOR, thus the circuit of a time alarm TA, which commences to move towards its ten second contact when CKR operates, is opened at the back contact of VOR, restoring it to its O position. During intervals of no speech, VOR falls away and should this interval exist for ten seconds, TA will operate CTR which opens the circuit of clutch cl. 2, thus causing the recorder to come to rest until speech starts again. When spool D2 is fully wound, the circuit of clutch cl. 2 is opened at HC2 and guard lamp GL burns.

*Calling subscriber releases*

When a calling subscriber has finished dictating his message or when he otherwise hangs up, the automatic connection is released and when COR of the called line releases, ground is removed from wire $c_1$ thereby opening the circuit of the test relays T1R and T2R. The armatures of T2R fall away, releasing CKR and opening the circuits of brushes A to G inclusive. The control circuit is now free. The special line service circuit remains connected and the recorder remains in its advanced position. It does not rewind.

*Absentee subscriber returns*

The subscriber removes handset. If no message has been recorded during his absence, he again hears the busy tone. If a message has been recorded, the busy tone will not be heard. In either case, the subscriber momentarily depresses LK which operates 4DR, thus releasing $4SSR_1$ and 4FR. The subscriber replaces handset and waits for the recorder to rewind if messages are indicated. When the rewind is complete, the subscriber receives one short ring of two seconds due to the operation of relay 4RR. The circuit of this relay is momentarily closed from ground at HC1, contact C1, back 4CR, contact C2, winding 4RR to battery. As above described, circuit to ground at HC1 is closed for two seconds only. By this means, the subscriber is not forced to guess at the time he should wait for the rewind but is informed immediately when the rewind is complete. Should the subscriber be talking on the line when the rewind is finished, this short ring will not be given since the circuit of RR will be found open at 4CR which is energized by the ground on wire $c_1$ whenever the cut-off relay COR of the line is energized.

*Absentee subscriber connects recorder for listening*

The returned absentee subscriber dials the proper special line service number for listening, we will assume it is 003, and operates $4SSR_2$ as well as $4SSR_1$ by selecting this circuit through the special intermediate (3rd) selector. If the rewind is complete, the subscriber will hear the busy tone. $4SSR_2$ places a ground on 4CSR and terminal T whether or not the recorder is still rewinding. A control circuit picks up the calling special line service circuit. When brush C makes contact, CAR (Fig. 5) and 4BR operate in series, circuit from battery, front $4SSR_2$, winding 4BR, brush C, winding CAR, back CBR to ground. 4BR locks up over its front contact, and over a back contact releases $4SSR_1$ and $4SSR_2$, but grounds T before $4SSR_2$ falls off. Over another back contact, 4BR removes battery from the rewind circuit of clutch cl. 1. 4BR disconnects the *a* and *b* wires of the subscriber's line from the automatic equipment and in place thereof connects them to the A and B brushes through the twin windings of 4ER which have non-inductive shunts to permit the passage of voice currents from the recorder. From brushes A and B the circuit continues over front contacts of CAR (Fig. 5) to positive and negative battery through CDR and CER respectively. CER and CDR operate and CER energizes CBR. CBR removes ground from winding of CAR but not before it is connected over the front contacts of CDR and CER in multiple and in series with a front contact of CAR.

Should the subscriber be in doubt as to the condition of rewind, he may find out at any time if it is complete by momentarily depressing RWK, thereby releasing CER. This will energize $CFR_1$, circuit from battery, front T2R, back CER, front CDR, back $CHR_1$, back $CGR_1$, winding $CFR_1$ to ground. $CFR_1$ closes its front contact and when RWK is released, CER is again energized, thereby removing the short-circuit from $CGR_1$ which now operates and locks up in series with $CFR_1$. $CGR_1$ connects negative battery to brush D through relay CNR. Should the rewind be incomplete, contact C4 and HC1 (Fig. 4) will be closed and CNR will operate in series with C1, rectifier S1 and back 4GR. CNR connects the rewind tone interrupter RW1 to one winding of transformer TT3 (Fig. 5), the other winding of which is connected across the *a* and *b* wires through condenser C9. The rewinding tone is heard by the calling subscriber who may wait until the rewind is complete since cl. 1 is now also energized, or he may hang up and call later when he hears the rewind ring as previously described. Should the rewind be complete when RWK is depressed, CNR will find an open circuit and the subscriber will not hear the rewind tone.

*Absentee subscriber listens to messages*

With the rewind complete, the subscriber depresses LK for an instant, thereby deenergizing CRD (Fig. 5) but not CER. $CFR_2$ operates and after LK is released, $CGR_2$ operates and positive battery is placed on brush D. Current from this battery passes through rectifier S(+) (Fig. 4) and operates 4GR. 4GR connects the positive current over a front contact and energizes clutch cl. 2. D2 commences to unwind D1 and draws the wire with the magnetically recorded messages over recording and transmitting needle RT. It will be noted that no current flows through the wipe-out magnet W since the rectifier S(—) prevents the flow of current from the positive battery.

CBR (Fig. 5) energizes CMR and CMR reverses the connections of the amplifier transformers TT1 and TT2 so that the minute currents picked up by needle RT are amplified by V and transmitted through transformer TT1 and condensers C1 and C2 to the *a* and *b* wires, thence through the non-inductive windings of 4ER to the calling line to be heard by the listening subscriber. The subscriber may stop repetition at any time by a second momentary depression of LK which operates $CGR_2$ which, in turn, releases $CFR_2$ and $CGR_2$. $CHR_2$ remains energized until LK is restored. The subscriber may restart the recorder by a third depression of LK and again stop it by a fourth depression. The subscriber may rewind the message wire on spool D1 as much and as many times as he desires by a similar use of RWK. During rewinding CNR (Fig. 5) is energized and the subscriber hears the rewinding tone.

From the above it will be seen that the subscriber may have part or all of the messages repeated as many times as he wishes and that the messages remain on the wire until the recorder is again connected for receiving. After so connected the old messages will be wiped out as new messages are recorded.

*Subscriber releases*

When spool D2 has wound up all recorded messages, RA comes into contact with RB in its advanced position which, as before stated, is that position in which the last recorded message finished. Contact is made between spring S1 and BS thereby closing the primary circuit of the busy tone interrupter and transformer TT2. The subscriber hears the busy tone and unless he wishes to re-listen to all or a portion of the messages, he hangs up and in so doing opens the line circuit and releases CDR and CER which opens the holding circuit of CAR and 4BR. Both circuits return to their normal disconnected condition and D1 rewinds, circuit from ground at HC1, contact C4, magnet cl. 1, rectifier S(—), back 4GR, back 4FR, back 4BR to battery. When D1 is fully rewound, C4 opens and the recorder comes to rest. RA closes contact S2 (opened when RA is off-normal) and energizes clutch magnet cl. 3 over the latter's home contact HC3. RB is released and returns to its normal position under the tension of retractile spring RS and opens home contact HC3.

*Subscriber cuts out temporarily*

Should the subscriber wish to cut out temporarily, he depresses AK while listening to a recorded message, that is, while D2 is rotating, after which he hangs up. The recorder ceases rotation and remains in its advanced position but the line circuit is freed to make and receive calls. When AK is depressed, 4ER releases and locks up 4GR, circuit from ground, one winding of 4GR, front 4GR, back 4ER to battery. When the handset is replaced, CDR and CER fall away and release the circuits of Figs. 4 and 5. 4GR remains locked up until the special service line circuit is again connected for listening. Clutch cl. 2 falls away when T2R opens the circuit of the D brush.

*Subscriber answers incoming call*

Should an incoming call arrive over a final selector while the subscriber is listening to the message, a small amount of ringing current will pass through condensers C3 and C4 (Fig. 4) and will be heard by the subscriber. The disturbance will not be enough to prevent listening should the subscriber prefer to continue listening, but should the subscriber desire to answer the call without releasing the special line service circuit (Fig. 4) and the control circuit (Fig. 5), he may do so by momentarily depressing the answering key AK which introduces resistance R1 into the line circuit. 4ER falls off and closes a circuit from ground at the energized cut-off relay of the subscriber's line circuit, wire $c_1$, front 4BR, back 4ER, winding, 4AR to battery. 4AR can be operated only when there is a ground on wire $c_1$ and locks up over a front contact and a front of 4BR to this ground. The ringing current is tripped by a circuit which may be traced from the *a* wire, resistance R2, front 4AR, back 4ER to the *b* wire. When AK is released and R1 short-circuited, 4ER operates and removes the tripping shunt from the *a* and *b* wires. 4AR shunts condensers C3 and C4 by higher capacity condensers C5 and C6 sufficient to afford proper conversation between the calling and called parties. The current supply for the absentee subscriber's transmitter comes from the positive and negative batteries through relays CDR and CER which have relatively high resistances to prevent damage to the transmitter.

When the calling party hangs up, ground is removed from the $c_1$ wire, 4AR releases and restores the listening circuit to its normal condition. It should be noted that the subscriber has full control of the recorder even while talking and because of this may, if he so desires, permit a recorded message to be listened to by a calling subscriber.

Many modifications are possible. For example, by the use of an additional pair of wires to the absentee station, it becomes easily possibly to arrange the recorder circuit so that messages may be listened to by, for example, the subscriber's secretary while the main line is being used for conversation. With this extra pair of wires, it also becomes possible to connect the recorder at will to the line to record conversation, as well as messages when the subscriber is absent.

What is claimed is:

1. In a telephone exchange system, a plurality of numerically designated subscribers' lines, means including groups of selector switches for establishing a connection between a calling and a called line, a plurality of special line service circuits, means controlled over a line in accordance with a numerical digit for operating means including a selector to select a circuit, a first relay associated with each circuit and operable to establish a connection between said line and the selected circuit, a second relay controllable over said line, a locking circuit for the first relay controlled in a back contact of the second relay, and means in said selector for applying a signal to said line and for releasing the selector and other means employed in the selection of the circuit.

2. The telephone exchange system according to claim 1, and in which the first relay has contacts connected with said line over a condenser and the second relay.

3. In a telephone exchange system, a plurality of numerically designated two wire subscribers' lines, means including groups of numerical selector switches for establishing a connection between a calling and a called line, a pluarlity of special line service circuits, means controlled by a line in accordance with numerical digits for operating some of said selectors to select a circuit for the line, a first relay for each circuit energized upon its selection and having contacts connected with its circuit and with the two wires of said line, a second relay connected with said line and controllable thereover, a locking circuit for the first relay controlled in a contact of the second relay, means for applying a signal to said line, and means for releasing the selectors and other means used in the selection of the circuit.

4. The telephone system according to claim 3, and in which the second relay has two differentially wound windings, one connected in series in each line wire of said line and with the selected circuit over the contacts of the first relay.

5. In a telephone exchange system, a plurality of numerically designated two wire subscribers' lines, means including groups of numerical selector switches for establishing a connection between the two wires of a calling and a called line, a plurality of special line service circuits, means controlled over the two wires of a line in accordance with numerical digits for operating some of said selectors to select one of said circuits, a first relay for each circuit energized upon its selection and having contacts connected with its circuit and with the two wires of said line, a second relay having a winding in each wire of said line, a locking circuit for the first relay controlled in a contact of the second relay, and means for releasing the selectors operated in the selection of the circuit.

6. The telephone system according to claim 5, and in which the line wires of said line extend over the windings of the second relay to a group of selectors, a branch connection from contacts of the first relay to the wires of said line between the windings of the second relay and the subscriber's station, and condensers in said branch connections.

7. In a telephone exchange system, a plurality of subscribers' lines, means including groups of numerical and non-numerical switches for establishing a connection between a calling and a called line, a plurality of special line service selection circuits accessible over a selector under the control of a line, a first relay in each of said selection circuits energized upon the selection of the circuit by said selector, a plurality of special line service circuits, a second relay responsibe to the energization of the first relay for connecting one of said service circuits with said line, a third relay controlled over said line, a locking circuit for the second relay controlled in a back contact of the third relay, a signal in said selector applied to said line upon the selection of a service circuit, and means also operable upon the selection of a service circuit for releasing the selector connecting the line with the selection circuit.

8. In a telephone exchange system, a plurality of subscirbers' lines, means including groups of numerical and non-numerical switches for establishing a connection between a calling and a called line, a plurality of special line service selection circuits accessible over a selector under the control of a line, a first relay in each of said selection circuits energized upon the selection of the circuit by said selector, a pluarlity of special line service circuits, a second relay responsive to the energization of the first relay for connecting one of said service circuits with said line, a third relay having two differential windings connected in series with said line, a locking circuit for the second relay controlled in a back contact of the third relay, a signal in said selector applied to said line upon the selection of a service circuit, and means also operable upon the selection of a service circuit for releasing the selector connecting the line with the selection circuit and all said relays except the second relay.

9. In a telephone exchange system, a plurality of subscribers' lines, means including groups of numerical and non-numerical switches for establishing a connection between a calling and a called line, a plurality of special line service selection circuits accessible over some of said selectors under the control of a line, a first relay in each of said selection circuits energized upon the selection of the circuit, a plurality of special line service circuits, a second relay responsive to the energization of the first relay for connecting one of said service circuits with the last-mentioned line, a third relay having two differential windings connected in series with said line, a locking circuit for the second relay controlled in a bank contact of the third relay, a fourth relay associated with the selector which selected the circuit, a fifth relay common to all the first relays, a circuit for the fourth relay jointly controlled by the first and the fifth relays, a signal applied to said line under the control of said fourth relay, and means responsive to the operation of said fourth relay for releasing said some of said selectors connecting said line with the selection circuit and all said relays except the second relay.

10. In a telephone exchange system, a plurality of subscribers' lines, means including groups of numerical and non-numerical switches for establishing a connection between a calling and a called line, said numerical switches including groups of first, second and third selectors, each of said selectors having levels of terminals and brushes cooperating therewith, a special line service selection circuit multipled to each level of certain third selectors, trunks connecting one level of certain second selectors to the brushes of said certain third selectors, trunks connecting one level of the first selectors to the brushes of said certain second selectors, a first relay in each of said selection circuits energized upon the selection of the circuit by one of said certain third selectors, a plurality of special line service circuits, a second relay responsive to the energization of the first relay for connecting one of said service circuits with the calling line, a third relay having two differential windings connected in series with said calling line, a locking circuit for the second relay controlled in a back contact of the third relay, a fourth relay associated with each of said certain third selectors, a fifth relay common to all the first relays, a circuit for the fourth relay jointly controlled by the first and the fifth relays, a signal applied to said calling line under the control of said fourth relay, and means responsive to the operation of said fourth relay for releasing the selectors connecting the calling line with the selection circuit and all said relays except the second relay.

11. In a telephone exchange system, a plurality of numerically designated two-wire subscribers' lines, means including groups of numerical selector switches for establishing a connection between the two wires of a calling and a called line, a plurality of special line service circuits, means controlled over the two wires of a line in accordance with numerical digits for operating some of said selectors to select one of said circuits, a first relay for each circuit operated upon its selection and having contacts in series in each wire of said line and contacts connected with the associated service circuit, a second relay having a winding connected in a line wire between the subscriber's station and the contacts of the first relay, and a circuit for the first relay controlled in a contact of the second relay.

12. In a telephone exchange system, a plurality of numerically designated two-wire subscribers' lines, means including groups of numerical selector switches for establishing a connection between the two wires of a calling and a called line, a plurality of special line service circuits, means controlled over the two wires of a line in accordance with numerical digits for operating some of said selectors to select one of said circuits, a first relay for each circuit energized upon its selection and having an armature and a back contact in series in each wire of said line and front contacts connected with the associated service circuit, a second relay having two differentially wound windings, one connected in series in each line wire between the subscriber's station and the armatures of the first relay, a locking circuit for the first relay controlled in a back contact of the second relay.

13. In a telephone exchange system, a plurality of numerically designated two-wire subscribers' lines, means including intermediate and final selector switches for establishing a connection between the two wires of a calling and a called line, the final selectors having sets of terminals in which extensions of the two wires and of test and control wires of each line terminate, a plurality of special line service positions, means controlled over the two wires of a line in accordance with numerical digits for operating a selector to select one of said positions, a first relay for each position energized over the test wire extension of said line and having contacts in each line wire of said line and extensions thereof, a second relay having a winding in a line wire between the subscriber's station and the contacts of the first relay, a locking circuit for the first relay controlled in a back contact of the second relay, and paths leading to the selected position over said contacts of the first relay.

14. In a telephone exchange system, a plurality of numerically designated two-wire subscribers' lines, means including intermediate and final selector switches for establishing a connection between the two wires of a calling and a called line, the final selectors having sets of terminals in which extension of the two wires as well as of test and control wires of the lines terminate, a plurality of special line service positions, means controlled over the two wires of a line in accordance with numerical digits for operating an intermediate selector to select one of said positions, a first relay for each position energized over the test wire extension of said line and having armatures, one inserted in each line wire of said line and cooperating back and front contacts, the line wire extensions to terminals of said line in the final selectors being connected to back contacts cooperating with the armatures inserted in the line wires, and to two other armatures of the first relay, a second relay having two differentially wound windings, one connected in series in each line wire between the subscriber's station and the armatures of the first relay inserted in the line wires, a locking circuit for the first relay controlled in a back contact of the second relay, and paths leading to the selected position over the armatures and cooperating front contacts of the first relay.

15. In a telephone exchange system, a plurality of numerically designated two-wire subscribers' lines, means including intermediate and final selector switches for establishing a connection between the two wires of a calling and a called line, said final selectors having sets of terminals in which extensions of the two line wires, as well as a test and a control wire of each line terminate, a plurality of special line service circuits, an operator's position at one of said circuits, said position comprising a jack, a signal and a cord circuit, a ring-back key in the cord circuit, means controlled over the two wires of a line in accordance with numerical digits for operating a selector to select one of said circuits, a first relay for each circuit energized over the test wire of said line and having contacts in each wire of said line, a second relay having a winding in one line wire between the subscriber's station and the contacts of the first relay, a locking circuit for the first relay including a back contact of the second relay, a third relay controlling the signal, a fourth and a fifth relay associated with said position and controlling the circuit of the third relay, a circuit for the fourth relay including the control wire extension of said line and a contact of the fifth relay, paths from the line wire extensions terminating in the final selectors over front contacts of the first relay to contacts of the fourth relay, an energizing circuit for the fifth relay including front contacts of the first relay and the sub-station of said line, contacts for the fifth relay connecting the jack with the two wires of said line over front contacts of the first relay, and a relay at the position for applying ringing current to said line controlled by said ring-back key.

16. In a telephone exchange system, a plurality of numerically designated two-wire subscribers' lines, a sub-station for each line, a key at some of the sub-stations for grounding one of the line wires, means including intermediate and final selector switches for establishing a connection between the two wires of a calling and a called line, said final selectors having sets of terminals in which extensions of the two line wires, as well as a test and a control wire of each line terminate, a plurality of special line service circuits, an operator's position at each circuit, each position comprising a jack, a signal and a plurality of cord circuits, a listening and a ring-back key in each cord circuit, means controlled over the two wires of a line in accordance with numerical digits for operating an intermediate selector to select one of said circuits, a double wound first relay for each circuit energized over one winding and the test wire of said line, and having an armature in each line wire and in each line wire extension of said line, back contacts for said relay connecting the extensions of the line wires of said line with the armatures in the line wires, a second relay having two differentially wound windings, one connected in series in each line wire between the subscriber's station and the armatures in the line wires, a locking circuit for the first relay including its second winding and a back contact of the second relay, a third relay bridged across the two conductors at the jack over a condenser, a circuit for the signal controlled by the third relay, a fourth and a fifth relay associated with said position and controlling the circuit of the third relay, a circuit for the fourth relay including the control wire of said line and a contact of the fifth relay, paths extending from the line wire extensions terminating in the final selectors over front contacts of the first relay to front and back contacts of the fourth relay, to the latter over condensers, an energizing circuit for the fifth relay including front contacts of the first relay and the first relay armatures in the line wires, contacts for the fifth relay connecting the conductors leading to the jack with the line wires over front contacts of the first relay, and a relay in the service circuit for applying ringing current to said line controlled by said ring-back key.

17. In a telephone exchange system, a plurality of numerically designated lines, means including automatic selector switches operable in accordance with the numerical designations of lines for interconnecting calling and called lines, a plurality of phonograph devices at the exchange, each of said devices having means for recording and for reproducing speech, a first connection established from a line over some of said selector switches under the control of said line to take into use an idle device, means operative thereupon for establishing a second connection from the device taken into use to said line and releasing the first connection, means operable over said line for operating the phonograph device taken into use to reproduce speech recorded thereon over the second connection, means operable over a third connection established with said line through said automatic selector switches for connecting the phonograph device taken into use with the third connection, and means operative thereupon for actuating the device to record speech transmitted over the third connection.

18. In a telephone exchange system, a plurality of numerically designated lines, means including intermediate and final selector switches operable in accordance with the numerical designations of lines for interconnecting calling and called lines, a plurality of phonograph devices at the exchange, each of said devices having means for recording and for reproducing speech, a first connection established from a line over an intermediate selector under the control of said line to take into use an idle device, relay means operative thereupon for establishing a second connection to the device taken into use from said line and releasing the first connection, means operable over said line and including said intermediate selector to select the phonograph device taken into use and for operating it to reproduce speech recorded thereon over said second connection, a third connection established with the device taken into use over a final selector operated in accordance with the number of said line, means operable thereupon for actuating the phonograph device taken into use to record speech transmitted over the third connection, and signal means controlled by the phonograph device connected with said line over the second connection.

19. The telephone system according to claim 18, and in which the phonograph device has a normal and a plurality of operating positions, and means controlled by said line over the second connection for moving the device into any one of said positions.

20. The telephone system according to claim 18, and in which the phonograph device has a normal and a plurality of operating positions, and a circuit for the signal means closed only in the normal position of the device.

21. The telephone system according to claim 18, and in which the phonograph device has a normal and a plurality of operating positions, and a circuit for the signal means closed upon the selection of the device by the intermediate selector.

22. In a telephone exchange system, a plurality of numerically designated lines, means including automatic selector switches operable in accordance with the numerical designations of lines for establishing a talking connection between calling and called lines, a plurality of phonograph devices at the exchange, each of said devices having means for recording and for reproducing speech and means for moving it from a normal towards an actuated position and back into normal, a first connection established from a line over some of said selector switches under the control of said line to take into use an idle device, relay means operative thereupon for establishing a second connection to the device taken into use from said line and releasing the first connection, means operable over said line and including some of said selector switches to select the phonograph device taken into use to reproduce speech recorded thereon, means operable over a talking connection established with said line for actuating the phonograph device taken into use to record speech, and means for signaling to said line over the second connection the position of the phonograph device taken into use.

23. In a telephone exchange system, a plurality of numerically designated lines, means including automatic selector switches operable in accordance with the numerical designations of lines for interconnecting calling and called lines, a plurality of phonograph devices at the exchange, each of said devices having means for recording and for reproducing speech, common control means for all the phonograph devices, a connection established from a line over some of said selector switches under the control of said line to take into use an idle device, relay means operative thereupon for connecting the device taken into use with said line and releasing said connection, a selector controlled over said line to connect the common control with the phonograph device taken into use for operating it to reproduce speech recorded thereon, and means operable over a connection established with said line through said automatic selector switches to connect the common control with the phonograph device taken into use for operating it to record speech.

24. In a telephone exchange system, a plurality of numerically designated lines, means including intermediate and final selector switches operable in accordance with the numerical designations of lines for interconnecting calling and called lines, a plurality of phonograph devices at the exchange, each of said devices having means for recording and for reproducing speech, common control means for all the phonograph devices, a first connection established from a line over an intermediate selector under the control of said line to take into use an idle device, relay means operative thereupon for establishing a second connection to the device taken into use from said line and releasing the first connection, means controlled over said line to operate an intermediate selector to select the device taken into use, means operative thereupon to connect the common control with the phonograph device taken into use and for operating the device to reproduce speech recorded thereon, a third connection established with said device over a final selector and means operative thereupon to connect the common control with said device and for operating it to record speech.

25. In a telephone exchange system, a plurality of numerically designated lines, means including intermediate and final selector switches operable in accordance with the numerical designation of lines for interconnecting calling and called lines, a plurality of phonograph devices at the exchange, each of said devices having speech recording and reproducing means, common control means for all the phonograph devices including an amplifying tube, a first connection established from a line over an intermediate selector under the control of said line to take into use an idle device, means operative thereupon for establishing a second connection from said line to the device taken into use and for releasing the first connection, means controlled over said line to operate an intermediate selector to select the device taken into use, means operative thereupon to connect said recording and reproducing means over said tube with the second connection, a third connection established with the device over a final selector, and means operative thereupon to extend the third connection over said tube with said means for recording and reproducing speech.

26. In a telephone exchange system, a plurality of numerically designated lines, means including intermediate and final selector switches, operable in accordance with the numerical designations of lines for interconnecting calling and called lines, a plurality of phonograph devices at the exchange, each of said devices having speech recording and reproducing means, common control means for all the phonograph devices including an amplifying tube having anode, cathode and grid electrodes, a first connection established from a line over an intermediate selector under the control of said line to take into use an idle device, relay means operative thereupon for establishing a second connection from said line to the device taken into use and for releasing the first connection, means controlled over said line to operate an intermediate selector to select the device taken into use, means operative thereupon to couple said recording and reproducing means with the grid of said tube and to couple the anode of said tube with the second connection, a third connection established with the device over a final selector and means operative thereupon to couple the grid of said tube with the third connection and to couple the anode of said tube with said means for recording and reproducing speech.

27. In a telephone exchange system, a plurality of numerically designated lines, means including intermediate and final selector switches, operable in accordance with the numerical designations of lines for interconnecting calling and called lines, a plurality of phonograph devices at the exchange, each of said devices having speech recording and reproducing means, common control means for all the phonograph devices including an amplifying tube having anode, cathode and grid electrodes, a first connection established from a line over an intermediate selector under the control of said line to take into use an idle device, relay means operative thereupon for establishing a second connection from said line to the device taken into use and for releasing the first connection, means controlled over said line to operate an intermediate selector to select the device taken into use, means operative thereupon to couple said recording and reproducing means with the grid of said tube and to couple the anode of said tube with the second connection, a third connection established with the device over a final selector, circuits closed thereupon to the grid of said tube from the third connection and from the anode of said tube to said means for recording and reproducing speech, a voice operated relay in the anode circuit, a time operated device controlled by the last-mentioned relay, and means for advancing the phonograph device controlled by the time operated device.

28. In a telephone exchange system, a plurality of numerically designated lines, means including intermediate and final selector switches, operable in accordance with the numerical designations of lines for interconnecting calling and called lines, a plurality of phonograph devices at the exchange, each of said devices having speech recording and reproducing means and a record erasing means, common control means for all the phonograph devices including an amplifying tube having anode, cathode and grid electrodes, a first connection established from a line over an intermediate selector under the control of said line to take into use an idle device, relay means operative thereupon for establishing a second connection from said line to the device taken into use and for releasing the first connection, means controlled over said line to operate an intermediate selector to select the device taken into use, means operative thereupon to couple said recording and reproducing means with the grid of said tube and to couple the anode of said tube with the second connection, a third connection established with the device over a final selector, and means operative thereupon to operate the record erasing means and to couple the grid of said tube with the third connection and to couple the anode of said tube with said means for recording and reproducing speech.

29. The system according to claim 24, and means in said common control means and controlled over said line and the second connection for advancing said phonograph device into any position.

30. The system according to claim 24, and in which the phonograph device has a normal and operated position, and means in said common control and controlled over said line and the second connection for moving said phonograph device into the normal or any operated position.

31. In a telephone exchange system, a plurality of numerically designated lines, means including automatic selector switches operable in accordance with the numerical designations of lines for interconnecting calling and called lines, a plurality of phonograph devices at the exchange, each of said devices having means for recording and for reproducing speech and means for moving it from a normal towards an actuated position and back into normal, a first connection established from a line to take into use an idle device, said first connection including one of said selector switches operated under the control of said line in accordance with a numerical digit, relay means operative thereupon for establishing a second connection from said line to the device taken into use, means operable upon the establishment of the second connection for releasing said first connection, means operable over said line and including said selector switch operated in accordance with another numerical digit to establish a third connection to the phonograph device taken into use to reproduce speech recorded thereon, means operable over a connection established with said line through said automatic selector switches in accordance with the numerical designation of said line for actuating the phonograph device taken into use to record speech, and means controlled over said line and the second connection for signaling to said line over said second connection the position of the phonograph device taken into use.

32. In a telephone exchange system, a plurality of numerically designated lines, means including intermediate and final selector switches operable in accordance with the numerical designations of lines for interconnecting calling and called lines, a plurality of phonograph devices at the exchange, each of said devices having means for recording and for reproducing speech and means for moving it from a normal towards an actuated position and back into normal, a first connection established from a line to take into use an idle device, said first connection including an intermediate selector operated under the control of said line in accordance with a numerical digit, relay means operative thereupon for establishing a second connection from said line to the device taken into use, means operable upon the establishment of the second connection for releasing said first connection, means operable over said line and including said intermediate selector operated in accordance with another numerical digit to establish a third connection to the phonograph device taken into use, means operative thereupon for connecting the phonograph device with the second connection and actuating it to reproduce speech recorded thereon, a third connection established with said device through a final selector operated in accordance with the numerical designation of said line, means operative thereupon for actuating the phonograph device taken into use to record speech transmitted over the third connection, and means controlled over said line and the second connection for signaling to said line over said connection the position of the phonograph device taken into use.

33. In a telephone exchange system, a plurality of numerically designated lines, means including automatic selector switches operable in accordance with the numerical designations of lines for interconnecting calling and called lines, a plurality of phonograph devices at the exchange, each of said devices having means for recording and for reproducing speech and means for moving it from a normal towards an actuated position and back into normal, common control means for all said phonograph devices including an amplifier and a source of current supply, a first connection established from a line to take into use an idle device, said first connection including one of said selector switches operated under the control of said line in accordance with a numerical digit, relay means operative thereupon for establishing a second connection from said line to the device taken into use, means operable upon the establishment of the second connection for releasing said first connection, means operable over said line and including said selector operated in accordance with another numerical digit to establish a third connection to the phonograph device taken into use and to connect the common control therewith for reproducing speech recorded thereon and transmitting it over said third connection, means operable over a connection established with said line through said automatic selector switches in accordance with the numerical designation of said line for connecting the common control with the phonograph device taken into use to record speech thereon which is transmitted over the last-mentioned connection, and means controlled over said line and the second connection for signaling to said line over said second connection the position of the phonograph device taken into use.

34. In a telephone exchange system, a plurality of numerically designated lines, means including automatic selector switches operable in accordance with the numerical designations of lines for interconnecting calling and called lines, a plurality of phonograph devices at the exchange, each of said devices having means for recording and for reproducing speech and means for moving it from a normal towards an actuated position and back into normal, common control means for all said phonograph devices including an amplifier, a source of current supply and a phonograph record, a first connection established from a line to take into use an idle device, said first connection including one of said selector switches operated under the control of said line in accordance with a numerical digit, relay means operative thereupon for establishing a second connection from said line to the device taken into use, means operable upon the establishment of the second connection for releasing said first connection, means operable over said line and including said selector switch operated in accordance with another numerical digit to establish a third connection to the phonograph device taken into use and to connect the common control therewith for reproducing speech recorded thereon and transmitting it through said amplifier into said third connection, means operable over a fourth connection established with said line through said automatic selector switches in accordance with the numerical designation of said line connecting the phonograph record in the common control with the fourth connection and for connecting the common control with the phonograph device taken into use to record speech thereon which is transmitted from the fourth connection over said amplifier, and means controlled over said line and the second connection for signaling to said line over said second connection the position of the phonograph device taken into use.

35. In a telecommunication exchange system, a plurality of numerically designated lines, means including numerically operated automatic switches for connecting a calling with a called line, a plurality of special service equipments at the exchange, switching means operable to connect one of said equipments with a line, means including some of said automatic switches for operating said switching means, and means operable thereupon for restoring to normal the automatic switches.

36. In the system according to claim 35, a numerically operable device associated with each line for controlling the automatic switches.

37. In the system according to claim 35, a switch associated with each line for controlling the switching means.

38. In a telephone exchange system, a plurality of numerically designated lines, means including numerically operated automatic switches for connecting a calling with a called line, means including an identification circuit for identifying the numerical designation of the calling line, a plurality of special service equipments at the exchange, switching means operable to connect one of said equipments with a line, means including some of said automatic switches and said identification circuit for operating said switching means, and means operable thereupon for restoring to normal the automatic switches and identification circuit.

39. In the system according to claim 38, a numerically operable device associated with each line for controlling said automatic switches to connect with said identification circuit.

40. In the system according to claim 38, means associated with each line for controlling the operation of said switching means.

41. In a telephone exchange system, a plurality of numerically designated lines, means including numerically operated automatic switches for connecting a calling with a called line, means including an identification circuit for identifying the numerical designation of the calling line, means associated with each line for controlling said switches, a plurality of special service equipments at the exchange, a relay for each equipment operable to connect it with a line, means responsive to certain operation of one of said switches to actuate said identification circuit and relay, and means operable thereupon for restoring to normal the automatic switches and identification circuit.

42. In the system according to claim 41, a second relay for each line controllable thereover and controlling the operation of the first-mentioned relay.

43. In the system according to claim 41, a differentially wound relay for each line with its windings connected in series in the line, a locking circuit for the first-mentioned relays controlled by the differentially wound relays, and a grounding key associated with each line.

GERALD DEAKIN.

No references cited.